US012607222B2

(12) United States Patent
    Greshuk et al.

(10) Patent No.: US 12,607,222 B2
(45) Date of Patent: Apr. 21, 2026

(54) APPARATUS AND METHOD FOR REFINING A BALL JOINT STUD

(71) Applicant: Musashi Auto Parts Canada Inc.,
                Waterloo (CA)

(72) Inventors: Scott Greshuk, Kenilworth (CA);
               Usam Ayad Nasser, Guelph (CA);
               Anthony Edward Meola, Guelph
               (CA); Peter Jacob MacPherson,
               Cambridge (CA); Wenxuan Lu,
               Kitchener (CA); Tyler Benson Veld,
               Listowel (CA)

(73) Assignee: Musashi Auto Parts Canada Inc.,
               Waterloo (CA)

( * ) Notice: Subject to any disclaimer, the term of this
              patent is extended or adjusted under 35
              U.S.C. 154(b) by 0 days.

(21) Appl. No.: 18/819,550

(22) Filed: Aug. 29, 2024

(65) Prior Publication Data

US 2025/0075731 A1      Mar. 6, 2025

Related U.S. Application Data

(60) Provisional application No. 63/535,665, filed on Aug.
     31, 2023.

(51) Int. Cl.
     *F16C 11/06*        (2006.01)
     *B23P 9/02*         (2006.01)
(52) U.S. Cl.
     CPC ............ *F16C 11/0685* (2013.01); *B23P 9/02*
         (2013.01); *F16C 11/0604* (2013.01); *B23P*
                                           *2700/11* (2013.01)
(58) Field of Classification Search
     CPC ..... F16C 11/0685; F16C 11/0604; B23P 9/02;
                                            B23P 2700/11
     See application file for complete search history.

(56) References Cited

U.S. PATENT DOCUMENTS 3,401,963 A      9/1968  Wehner
5,492,428 A  *   2/1996  Hellon .............. B29C 45/14754
                                              403/135

(Continued)

FOREIGN PATENT DOCUMENTS

JP        S6138730 A     2/1986
JP        H08238534 A    9/1996

(Continued)

OTHER PUBLICATIONS

CIPO as International Search Authority, International Search Report
and Written Opinion for PCT/CA2024/051123, Nov. 29, 2024.

*Primary Examiner* — Sarang Afzali
*Assistant Examiner* — Darrell C Ford
(74) *Attorney, Agent, or Firm* — Own Innovation Inc.;
James W. Hinton

(57)            ABSTRACT

Provided is a method and apparatus for refining a ball joint
stud. The method includes receiving and releasably securing
the ball joint stud in a holder between a first die and a second
die. The method further includes translating one or more of
the first die and the second die towards the remaining die to
apply a compression pressure to the ball joint stud. The
compression pressure causes a plastic radial compression of
the ball joint stud to a stroke length. The stroke length may
be to induce a residual stress in the ball joint stud or increase
a surface hardness of the ball joint stud. The first die and
second die each include a contact surface configured to
interface with the ball joint stud. The method may further
include rotating one or more of the first die and the second
die during the application of the compression pressure.

14 Claims, 10 Drawing Sheets

(56) References Cited

U.S. PATENT DOCUMENTS

| | | | | |
|---|---|---|---|---|
| 7,771,136 | B2 | 8/2010 | Buhl et al. | |
| 9,175,720 | B2 | 11/2015 | Adamczyk et al. | |
| 10,315,476 | B2 | 6/2019 | Wilcutt et al. | |
| 10,584,738 | B2 * | 3/2020 | Björnhov | F16C 11/0685 |
| 10,844,900 | B2 | 11/2020 | Reddehase et al. | |
| 11,332,799 | B2 | 5/2022 | Ando et al. | |
| 2007/0022795 | A1 | 2/2007 | Taniguchi et al. | |
| 2010/0000285 | A1 * | 1/2010 | Nishio | F16C 11/0614 |
| | | | | 72/352 |
| 2010/0021336 | A1 * | 1/2010 | Kruse | F16C 11/0623 |
| | | | | 420/36 |
| 2011/0293359 | A1 * | 12/2011 | Mahlmann | F16C 11/0633 |
| | | | | 403/140 |
| 2013/0121754 | A1 * | 5/2013 | Kuroda | F16C 11/069 |
| | | | | 29/505 |

FOREIGN PATENT DOCUMENTS

| | | | |
|---|---|---|---|
| JP | 2002130248 | A | 5/2002 |
| WO | 2009060565 | A1 | 5/2009 |

* cited by examiner

100

| | |
|---|---|
| Ball Joint Stud is Secured in a Holder | 102 |
| The Ball Joint Stud is Work Hardened | 104 |
| Stroke Limit Reached | 106 |
| Ball Joint Stud is removed from the holder | 108 |

APPARATUS AND METHOD FOR REFINING A BALL JOINT STUD

TECHNICAL FIELD

The following relates generally to ball joint studs particularly an apparatus and method for refining ball joint studs.

INTRODUCTION

A ball joint can provide a flexible connection between two components that allows movement of the components in more than one direction at the same time.

Ball joints play a critical role in the safe operation of, for example, automobile steering and suspension. Ball joints provide a safe, smooth ride and allow precise control of vehicles. If ball joints including these ball joint studs fail, the connected components may become unconstrained or disposed at an unintended angle. The results of this failure can be costly and dangerous.

For example, an automobile wheel may become unconstrained due to a failed or failing ball joint. Similarly, a front suspension of a car is a complex assembly of links, joints, bushings and bearings that allows front wheels to move up and down independently and turn left or right together. Ball joints of the front suspension provide pivoting movement between the steering knuckles and control arms. Worn ball joints contribute to looseness in the front suspension which may result in a tire being oriented at an unintended angle. This looseness often causes problems before they are noticeable by the driver such as when the vehicle is not maintaining wheel alignment. If the looseness is severe, the driver may notice steering looseness, steering vibration, or unusual noises.

Ball joint failures extend beyond inconvenience. Unconstrained wheels or misaligned tires may result in the tires not maintaining optimum contact with the road. This may contribute to excessive tire wear, shortening the life of expensive tires, and in some cases stud separation from the housing. This may also cause more sudden damage to tires, or in cases where debris is formed to other parts of the of the vehicle and the surroundings. They can also result in immediate loss of control of your vehicle including an abrupt halt of the vehicle, which may put everyone in danger.

Due to an often high and persistent working load, the ball joint studs wear down inside the housing during the normal course of operation. Conventional ball joint studs may have durability issues, particularly under high load conditions. These durability issues may include strength and fatigue issues. Conventional ball joints may have a reduced life span due to durability issues/reduced durability.

Such deficiencies and potential failures can increase costs and inconveniences. To avoid the safety risks and negative effects of worn ball joint studs, conventional ball joint studs may be replaced or repaired frequently.

Conventional methods of manufacturing ball joints can include treating the ball joint stud to increase the durability and the fatigue life of the ball joint stud. These conventional treatments harden the surface of the ball joint stud. The core of the ball joint stud is left softer for ductility. However, in conventional manufacturing methods the treatments may not optimally refine the ball joint stud. Conventional manufacturing methods are also costly and involve lengthy processing times.

These treatments, for example, may include thermal refinements such as high temperature hardening techniques. These thermal refinements include induction hardening and quenching and tempering heat treatment. However, thermal refinements may only be able to produce a fatigue life that is lower than sufficient or desired. Also, these thermal treatments may result in part that is out of tolerance due to the associated high margins in fatigue strength and resultant size of the treated ball joint stud. This is of particular concern in smaller ball joint studs often with smaller tolerances. These thermal refinements may also produce ball joint studs with a surface finish that is rougher than desired which may cause wear of both the stud and housing. Furthermore, the cost of thermal refinements may be undesirably high.

These thermal refinements may also result in a ball joint stud that is over designed. The ball joint stud may be made harder or deeper than for example required specifications. This overdesign may be necessary to ensure such specifications are met. For example, there may be challenges in controlling the extent of the refinement or the predicting the results of a refinement. However, this overdesign adds cost and may produce ball joint studs not optimally suited to their intended purposes.

These treatments may also include nitride, and carburized case hardening. However, these treatments may not satisfy chemical content requirements of the ball joint stud.

These treatments may also include shot peening. However, the shot peening may not achieve sufficient depth of material deformation. Also shot peening is difficult to control and may result in asymmetrical surface treatment leading to non-uniform fatigue life improvements. Additionally, shot peening may undesirably alter critical dimensions of the component. These issues may render the treated part as scrap or may require additional operations to correct costing time and resources.

Accordingly, apparatuses and methods for treating ball joint studs are desired which overcome conventional ball joint stud treatment assemblies and methods of manufacture.

SUMMARY

Provided is a method for refining a ball joint stud. The method includes receiving and releasably securing the ball joint stud, in a holder, between a first die and a second die and translating one or more of the first die and the second die towards the remaining die to apply a compression pressure to the ball joint stud. The compression pressure causes a plastic radial compression of the ball joint stud to a stroke length.

The stroke length may be based on inducing a desired residual stress in the ball joint stud. The stroke length may further be based on increasing a surface hardness of the ball joint stud to a predetermined threshold.

The method may further include rotating the first die and/or the second die during the application of the compression pressure for improving the surface finish of the ball joint stud.

The method may further include rotating the first die at a first die rotational velocity to induce the ball joint stud to rotate at a ball joint stud rotational velocity and rotating the second die at a second die rotational velocity based on the ball joint stud rotational velocity. The ball joint stud and second die rotate such that at an interface of the second die with the ball joint stud, the ball joint stud and second die progress at a similar tangential velocity.

The method may further include holding the first die and second die in contact with the ball joint stud for a dwell time.

The method may further include translating the second die away from the ball joint stud and repeating translating the active die towards the ball joint stud and translating the second die away until at least one predetermined threshold result is achieved.

The holder may further be configured to secure the ball joint stud in a manner that allows axial growth and radial deformation of the ball joint stud. Securing the ball joint stud in the holder may further include restraining movement in a plane normal to a primary axis of the holder and aligning a longitudinal axis of the ball joint stud in position and orientation with a primary axis of the holder.

Securing the ball joint stud in the holder may further include restraining a top surface of the ball joint stud.

Further provided is an apparatus for refining a ball joint stud. The apparatus includes a first die, a second die, and a holder. Each die includes a contact surface configured to interface with a profile of the ball joint stud. The holder is configured to receive and releasably secure the ball joint stud between the first die and the second die. The first die and/or the second die is configured to translate toward the remaining die to apply a compression pressure to the ball joint stud. The compression pressure causes a radial compression of the ball joint stud.

The first die and/or the second die is configured to be put in rotation about a longitudinal axis of each respective die.

Where the first die is configured to be put in rotation at a first rotational velocity, and the second die is configured to be put in a second rotational velocity the second die rotational velocity may be a rotational velocity wherein the tangential velocity of the second die at the interface with the ball joint stud is similar to the tangential velocity of the ball joint stud at the interface with the second die induced by the rotation of the first die.

A first die longitudinal axis of the first die and a second die longitudinal axis of the second die may be disposed parallel to a primary axis of the holder.

The holder may further be configured to secure the ball joint stud in a manner that allows axial growth and radial deformation of the ball joint stud, restrain movement in a plane normal to a primary axis of the holder, and/or align a longitudinal axis of the ball joint stud in position and orientation with a primary axis of the holder.

The holder may further include a restraint. The restraint may be configured to restrain a top surface of the ball joint stud.

Further provided is a work hardened ball joint stud wherein the ball joint stud is refined by disposing and releasably securing the ball joint stud, in a holder, between a first die and a second die and translating one or more of the first die and the second die towards the remaining die to apply a compression pressure to the ball joint stud. The compression pressure causes a plastic radial compression of the ball joint stud to a stroke length.

The stroke length may be based on inducing a desired residual stress in the ball joint stud and/or increasing a surface hardness of the ball joint stud to a predetermined threshold.

The refinement may further include rotating the first die and/or the second die during the application of the compression pressure for improving the surface finish of the ball joint stud.

The refinement may further include rotating the first die at a first die rotational velocity to induce the ball joint stud to rotate at a ball joint stud rotational velocity and rotating the second die at a second die rotational velocity based on the ball joint stud rotational velocity. The ball joint stud and second die rotate such that at an interface of the second die with the ball joint stud, the ball joint stud and second die progress at a similar tangential velocity.

The refinement may further include holding the first die and second die in contact with the ball joint stud for a dwell time.

The refinement may further include translating the second die away from the ball joint stud and repeating translating the active die towards the ball joint stud and translating the second die away until at least one predetermined threshold result is achieved.

The holder may further be configured to secure the ball joint stud in a manner that allows axial growth and radial deformation of the ball joint stud. Securing the ball joint stud in the holder may further include restraining movement in a plane normal to a primary axis of the holder and aligning a longitudinal axis of the ball joint stud in position and orientation with a primary axis of the holder.

Securing the ball joint stud in the holder may further include restraining a top surface of the ball joint stud.

Other aspects and features will become apparent to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings:

FIG. 3A is a cut away schematic of the work hardening apparatus and ball joint stud of FIG. 2, according to an embodiment;

FIG. 3B is a cross sectional schematic of the work hardening apparatus and ball joint stud of FIG. 3A, according to an embodiment;

DETAILED DESCRIPTION

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

A description of an embodiment with several components in contact or connection with each other does not imply that all such components are required. On the contrary, a variety of optional components are described to illustrate the wide variety of possible embodiments of the present invention.

Further, although process steps, method steps, algorithms or the like may be described (in the disclosure and/or in the claims) in a sequential order, such processes, methods and algorithms may be configured to work in alternate orders. In other words, any sequence or order of steps that may be described does not necessarily indicate a requirement that the steps be performed in that order. The steps of processes described herein may be performed in any order that is practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The present disclosure provides an apparatus and method for refining a ball joint stud. The method and apparatus directed to enhancing and increasing the fatigue life of a provided ball joint stud by deforming (i.e. work hardening) and/or burnishing the neck of a ball joint stud between dies.

Figure 1:
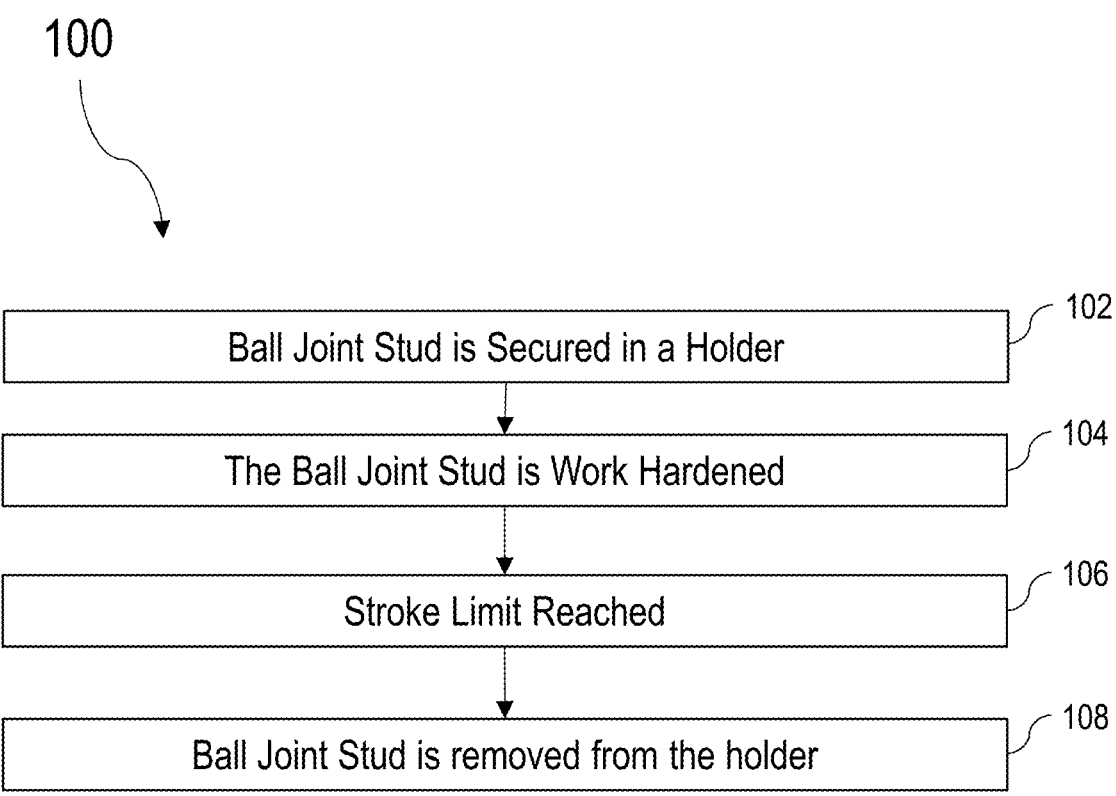
FIG. 1 is a block diagram of a method for refining a ball joint stud, according to an embodiment.

Referring to FIG. 1, shown therein is a block diagram of a method 100 for refining a ball joint stud, according to an embodiment. The method 100 may be implemented by the work hardening apparatus 200 of FIG. 2 described below.

The work hardening may provide the ball joint with improved performance characteristics, such as improved durability, surface hardness, and improved surface finish. The improved performance characteristics may result in a greater strength, a longer fatigue life, and a reduced roughness all of which may contribute to a longer lifespan. These improved performance characteristics may increase the longevity of the ball joint, particularly under high load conditions. The work hardening may also provide for desirable margins in fatigue strength and size (i.e. enable the characteristics to be within desired tolerances).

At 102, the ball joint stud is releasably secured in a holder.

Securing the ball joint stud in the holder may include configuring the holder in an open configuration. In the open configuration, the components of the holder are configured to receive the ball joint stud.

Configuring the holder in an open configuration may include transitioning a clamp of the holder from a closed configuration to an open configuration. The clamp in the open configuration is opened at least as wide enough to accommodate the profile of the ball joint stud at an interface between the clamp and the ball joint stud.

Configuring the holder in an open configuration may further include transitioning a restraint of the holder from a second position to first position. The restraint in the open configuration is positioned high enough to accommodate placement of the ball joint stud in the holder.

Configuring the holder in an open configuration may further include moving an active die from a closed position to an open position. The active die is disposed on a slide rail to facilitate the movement of the active die. A spindle assembly holding the active die may be mounted on the slide rail to mount the active die to the slide rail. The slide rail may be rigid linear guide rails to provide stable motion and minimize deflection of the active die. The movement (i.e. translation) of the active die may be driven by a step motor and a ball screw.

In the open position a longitudinal axis of the active die is positioned at an offset from the primary axis of the holder to accommodate placement of the ball joint stud in the holder. The offset may be based on a profile of the ball joint stud.

Securing the ball joint stud further includes placing the ball joint stud in the holder. The ball joint stud is placed in the holder such that a longitudinal axis of the ball joint stud is at least coarsely aligned with the primary axis in location and orientation of the holder. It will be appreciated that the alignment of the longitudinal axis of the ball joint stud may need to be refined prior to work hardening.

Securing the ball joint stud further includes configuring the holder in a closed configuration. The closed configuration may vary based on the profile of the ball joint stud being held. In the closed configuration the ball joint stud is secured in the holder such that a longitudinal axis of the ball joint stud is aligned in position and orientation with a primary axis of a work hardening apparatus. It will be appreciated that the ball joint stud may shift in the holder as the holder is transitioned from the open configuration to the closed configuration. This shift may be to achieve a better alignment of the ball joint stud from the alignment in the open configuration. In the closed configuration, the holder maintains the ball joint stud in this alignment.

In the closed configuration the ball joint stud is secured in the holder such that a neck of the ball joint stud is in contact with a fixed die. The contact may be minimal such that no significant force is exerted by the fixed die on the neck. The contact is sufficient such that any force applied to the ball joint stud opposite the contact will be resisted by the fixed die. The dimensions of the fixed die and active die are set based on the final desired shape and profile of the ball joint stud (i.e. a relief image). It will be appreciated that the contact of the fixed die with the ball joint stud may not be continuous. This may be due to differences in the initial (i.e. pre work hardened) and final desired shape of the ball joint stud.

Configuring the holder in a closed configuration may include transitioning the clamp from the open configuration to the closed configuration. The clamp, in the closed configuration, is closed to secure the ball joint stud from bending relative to the primary axis. The clamp, in the closed configuration, may further restrain a bottom end of the ball joint stud from expanding in axial direction. It will be appreciated that the closure of the clamp in the closed position may be of varying degree according to the profile of the ball joint stud at the interface with the clamp.

The closed configuration allows both axial growth (i.e. along the primary axis) and radial compression (i.e. inwards from the primary axis) of the ball joint stud. The radial compression may be at or near the neck of the ball joint stud. The fixture allows for axial displacement of the part during the work hardening operation. These freedoms allow the stud to automatically align with to the dies during work hardening and for axial expansion to be the direction of least resistance for excess material to plastically deform towards during compression.

For the initial elastic deformation, axial growth happens based on Poisson's ratio. For plastic deformation, typically the primary deformation behaviour for this work hardening process, the deformation is the same concept, except following the principles of conservation of volume (e.g. a cylinder that is stretched will see a decrease in diameter or vice versa). The freedom for axial travel allows and directs the deformed material to flow in the axial direction.

The closed configuration further allows the ball joint stud to rotate. The rotation facilitates the work hardening of the full circumference of the ball joint stud.

Configuring the holder in a closed configuration may further include transitioning a restraint of the holder from the first position to the second position. The restraint in the closed configuration is positioned in contact with a top surface of the ball joint stud. The contact may not initially exert any significant force on the ball joint stud. The contact is sufficient such that any positive expansion of the ball joint stud along the primary axis is restrained by the restraint.

At 104, the ball joint stud is work hardened. The application of the work hardening may vary by input parameters such as a limit of the amount of deformation, revolutions per minute (RPM) of the dies, dwell time, stroke length, pressure of the active die, initial profile of the stud and the profile of the dies. The parameters selected may be based on desired outputs such as resultant dimensions, residual stress, surface finish, strength, surface hardness and fatigue life of the ball joint stud. The input parameters may be based on tests conducted for a particular ball joint stud configurations and/or compositions. These tests may determine which input parameter values will maximize the desired outputs.

Work hardening the ball joint stud includes putting the fixed die and the active (collectively the "dies") in rotation. Each die rotates about its respective longitudinal axis at a predetermined RPM. The dies may rotate in opposite directions (i.e. clockwise and counterclockwise). The dies remain in rotation through the compression described below. The rotation of the dies drives rotation of the ball joint stud. The rotation of the ball joint stud facilitates compression of the entire circumference of the ball joint stud.

It will be appreciated that the work hardening may be achieved without rotating any or all of the dies or rotating each die at a different rotational velocity. However, rotating at least one die facilitates even compression of the entire circumference of the stud. Furthermore, rotating the dies such that the interface of each die and the ball joint stud rotate at nearly identical velocities provides a smooth rolling contact that mitigates the risk of slippage or sliding between or seizing of the ball joint stud and the dies. Avoiding this slipping, sliding, and seizing beneficially produces a better surface finish. The rotational velocity of the dies may vary over time. The variation or the rotational velocities may be coordinated to avoid slipping, sliding, or seizing.

Work hardening the ball joint stud further includes closing the active die on the neck of the ball joint stud. The active die is translated (also referred to as moved) towards the neck of the ball joint stud and the fixed die. The translation of the active die is via slide rail. The translation of the active die is along a line intersecting the primary axis and a longitudinal axis of the active die. The translation of the active die continues through contact with the ball joint stud.

Upon contact with the ball joint stud the rotating dies reduce the roughness of the ball joint stud at the contacted surface via roller burnishing. The roller burnishing improves the surface finish of the ball joint stud at the contact surface. The roller burnishing for example may remove machining lines or reduce localized stress concentrations. Roller burnishing may beneficially achieve a much finer surface finish than conventionally machined surfaces.

It will be appreciated that during work hardening, the holder and ball joint stud may displace in a plane normal to the primary axis. This displacement may be guided by holder slide rails. These holder slide rails may restrict displacement of the holder and ball joint stud to linear translation, such as in a direction corresponding to die translation. This displacement may improve alignment of the ball joint stud with the dies.

At 106, a hard stop limit for a desired amount of deformation of the ball joint stud is reached. At the hard stop limit, the translation of the active die is halted.

At the hard stop limit the active die is positioned past contact with neck of the ball joint stud. The positioning of the dies induces a compression pressure on the ball joint stud. The compression pressure causes the ball joint stud to deform (i.e. change the dimension) at the neck. The deformation results in radial compression and axial growth. Specifically, the section of the ball joint stud in contact with the dies decreases in cross-sectional diameter up to a stroke length due to the radial compression of the dies. It will be appreciated that the greater the stroke length up to a certain threshold the greater the fatigue life. It will be further appreciated that a greater stroke length typically requires greater load to compress the ball joint stud and may result in a lower quality surface finish.

The compressed section of the ball joint stud elongates axially as a result of this deformation. Axial growth of the ball joint stud depends on the die geometry, initial ball joint stud geometry, and the reduction in diameter of the ball joint stud.

The active die may remain at the hard stop limit for a predetermined dwell time. The dwell time can be predetermined based on a desired surface finish of the ball joint stud. The dwell time is dependent on the rotation velocity (RPM) of the dies, the desired final surface finish, and the desired cycles times.

The deformation is plastic such that deformation remains when the compression is released. A residual stress is induced in the neck corresponding to the deformation. The deformation and/or induced residual stress is a mechanism that provides the increased fatigue life. For example, size control of tolerances within 0.0005 inch (0.01 mm) or better, surface hardness of up to 5-15% over conventional methods, and fatigue lives of as much as 300% over conventional methods are beneficially achieved. These results may further be achieved with fewer resources (i.e. at a lower cost) over conventional methods.

At 108 the ball joint stud is removed from the holder. Removing the ball joint stud from the holder includes returning the holder to the open configuration. Removing the ball joint stud may also include stopping the rotation of the dies.

Figure 2:
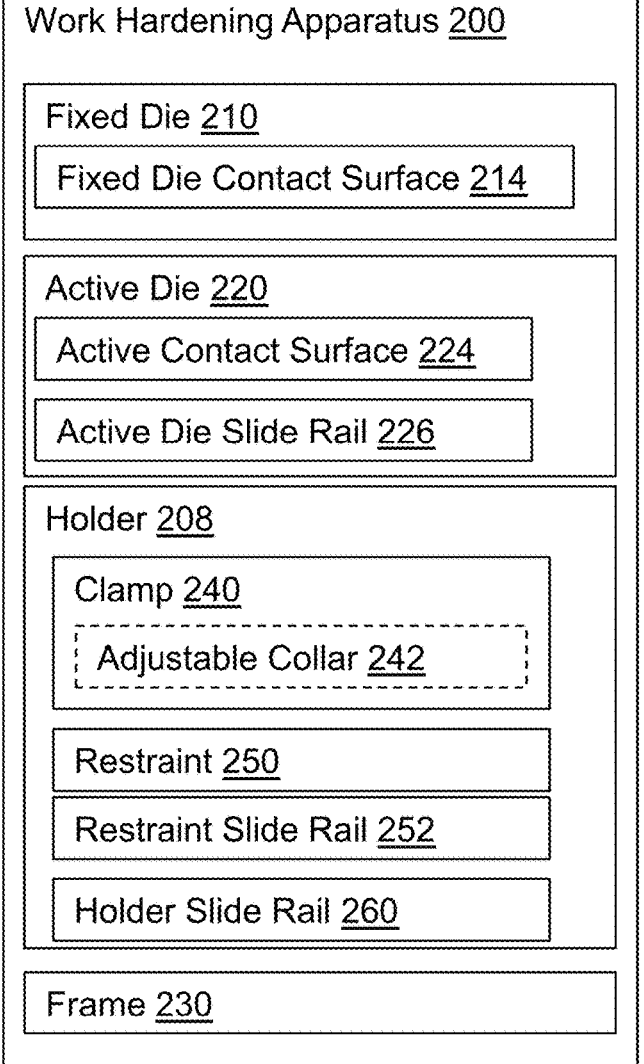
FIG. 2 is a block diagram of a work hardening apparatus for refining a ball joint stud, according to an embodiment.
Figure 2:
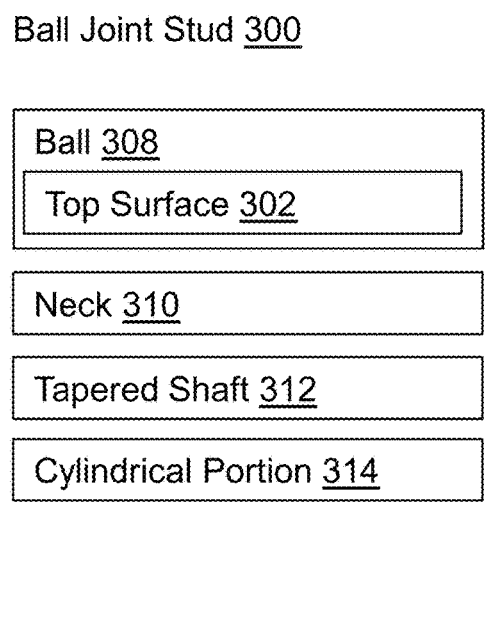
Figure 3A:
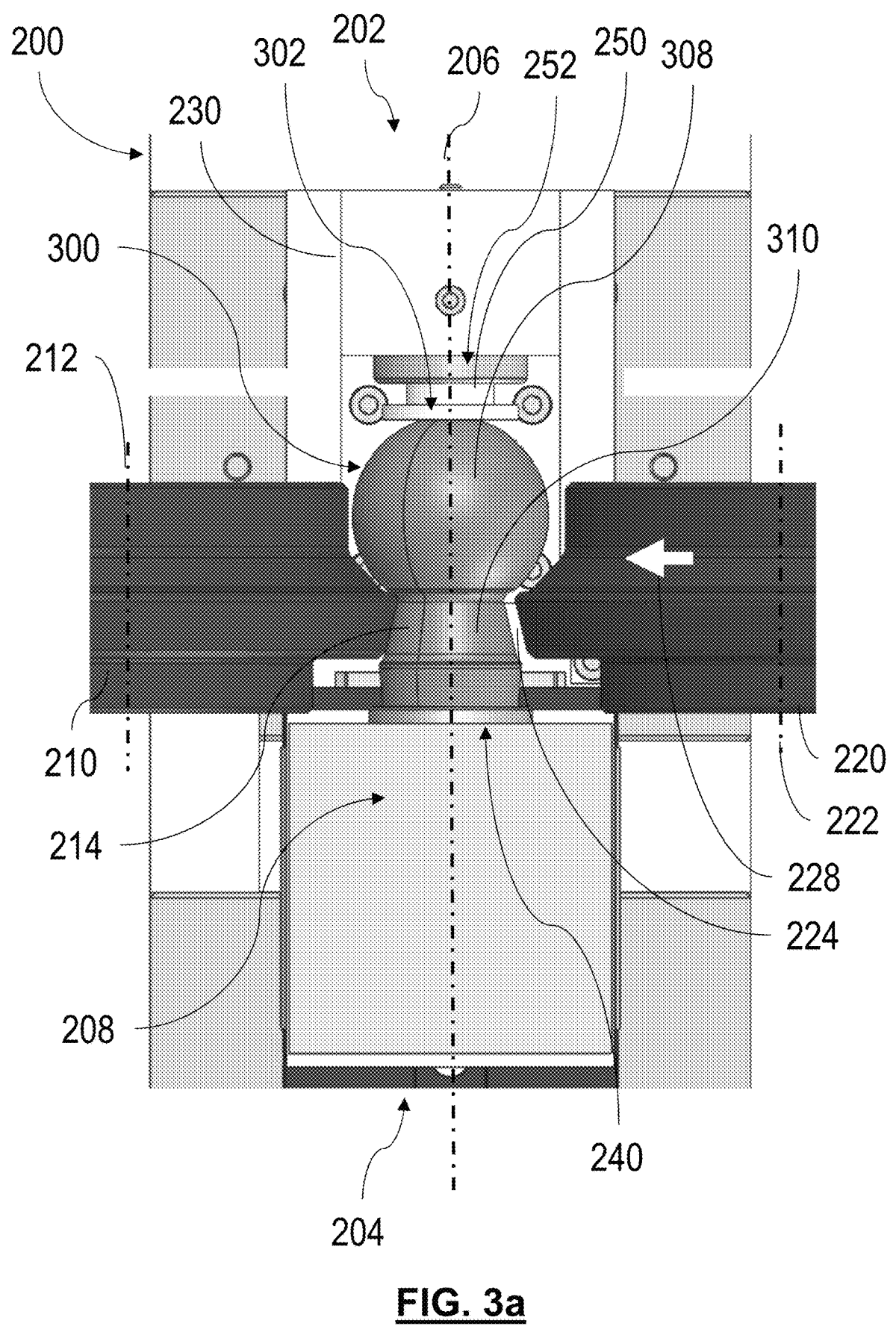

Referring to FIGS. 2 and 3, shown therein is a block diagram and a cut away schematic of a work hardening apparatus 200 for work hardening a ball joint stud 300, according to an embodiment.

The work hardening apparatus 200 has a top end 202 and a bottom end 204. The work hardening apparatus 200 includes a primary axis 206 that runs along the length of the work hardening apparatus 200. The top and bottom ends 202 & 204 are opposed to one another along the primary axis 206.

The work hardening apparatus 200 includes a frame 230. The frame 230 provides a structure for the work hardening apparatus 200.

The work hardening apparatus 200 includes a holder 208. The holder 208 releasable secures the ball joint stud 300 during the work hardening. The ball joint stud 300 is placed in the holder 208 and restrained prior to work hardening. After work hardening is completed, the ball joint stud 300 is released and removed.

The holder 208 secures the ball joint stud 300 such that a longitudinal axis of the ball joint stud 300 is aligned with the primary axis 206. The holder 208 may further secure the ball joint stud 300 such that the neck 310, further described below, is initially in contact with a fixed die contact surface 214, further described below. The contact between the neck 310 and the fixed die contact surface 214 provided by the holder 208 may initially be minimal. This minimal contact may not initially result in any significant force being exerted by the fixed die contact surface 214 on the neck 310. The minimal contact however is such that a force applied to the ball joint stud 300 opposite the contact will be resisted by the fixed die 210, further described below. Such a force may be applied by the active die 220, further described below.

Roller Dies:

The work hardening apparatus 200 further includes a fixed die 210. The fixed die 210 may also be referred to as a "fixed roller 210" or "fixed roller die 210". The fixed die 210 acts as a backstop to forces applied opposite the fixed die 210. For example, where forces are applied to the ball joint stud 300 opposite the fixed die 210, an opposite reaction force is induced and applied to the ball joint stud 300 by the fixed die 210. In an embodiment, the force applied to the ball joint stud 300 opposite the fixed die 210 is by the active die 220, described below.

The fixed die 210 is translationally fixed within the work hardening apparatus 200. The fixation may be to the frame 230. The fixation is rotatable such that the fixed die 210 may rotate about a fixed die LA 212. The fixed die 210 is fixed such that the fixed die LA 212 is oriented parallel to the primary axis 206. The fixed die 210 may be fixed to the holder 208 such as via a pin (not shown).

The fixed die 210 may be composed of a carbide material. The fixed die 210 may be hardened to provide a desired tool life.

The fixed die 210 is generally cylindrical in form. The fixed die 210 has a longitudinal axis (LA) 212. Portions of the fixed die 210 may taper in or out such that the profile of the fixed die 210 varies in diameter along the fixed die LA 212.

The fixed die 210 includes a fixed die contact surface 214. The fixed die contact surface 214 is an interface surface for contacting the ball joint stud 300. During work hardening, the fixed die contact surface 214 contacts the ball joint stud 300 at least partially at the neck 310, described below. It will be appreciated that the contact of the fixed die contact surface 214 may extend beyond the neck 310. For example, the contact may extend to the ball 308.

The fixed die contact surface 214 is a surface of a radial protrusion of the fixed die 210. The profile (i.e. shape and dimensions) of the fixed die contact surface 214 are set according to the final desired shape of the ball joint stud 300.

The fixed die contact surface 214 profile may be a relief of the profile of the ball joint stud 300 in the contacted area. The final desired shape of the ball joint stud 300 may be to meet specifications for the ball joint stud 300. These specifications may include limitations and tolerances of ball joint stud 300 dimensions, residual stress, surface finish, strength, surface hardness and fatigue life.

The work hardening apparatus 200 further includes an active die 220. The active die 220 may also be referred to as an "active roller 220" or "fixed active die 220". The active die 220 and the fixed die 210 are referred to herein generically as die 210 and collectively as dies 210. The active die 220 is oriented, configured, and composed similarly to the fixed die 210.

The active die 220 is rotatably connected to an active die slide rail 226. The connection is rotatable such that the active die may rotate about an active die LA 222. The connection may be via a spindle assembly (not shown). The active die slide rail 226 may be rigid linear guide rails. The active die slide rail 226 may be connected and supported by the frame 230.

The active die slide rail 226 facilitates translation 228 of the active die 220. Translation 228 of the active die 220 via the active die slide rail 226 is on a line intersecting the active die LA 222 and the primary axis 206. Translation 228 of the active die 220 facilitated by the active die slide rail 226 is bi-directional (i.e. towards and away from the ball joint stud 300). In an embodiment, the translation 228 is achieved via a step motor and a ball screw (not shown).

The active die 220 may be positioned at a hard stop limit (not shown). At the hard stop limit, active die contact surface 224 is disposed past contact with the ball joint stud 300. In this position, the active die 220 applies a predetermined force or displacement to the ball joint stud 300 at the interface of the active die contact surface 224. As described above, where forces are applied to the ball joint stud 300 by the active die 220, a reaction force is induced and applied to the ball joint stud 300 by the fixed die 210. The forces applied by the dies 210 on the ball joint stud 300 induce a compressive pressure in the ball joint stud 300.

The compressive pressure deforms the ball joint stud 300. The deformation is generally in region of the neck 310, described below. The deformation is plastic such that deformation remains when the compression is released (i.e. the active die is translated away from the ball joint stud 300).

A residual stress is also induced in the ball joint stud 300 corresponding to the deformation. Where increased fatigue life is the desired result, the deformation and/or induced residual stress may be the mechanism that provides the increased fatigue life. For example, size control of tolerances within 0.0005 inch (0.01 mm) or better, surface hardness of up to 5-10% over conventional methods, and fatigue lives of as much as 300% over conventional methods are beneficially achieved. These results may further be achieved with fewer resources (i.e. at a lower cost) over conventional methods.

It will be appreciated that some embodiments may include additional fixed dies 210 and/or active dies 220. It will further be appreciated that some embodiments may not include a fixed die 210. For example, an embodiment may include two active dies which may be translated, jointly or individually, to achieve the compression pressure.

Holder:

The holder 208 further includes a clamp 240. The clamp 240 is physically connected to frame 230 at the bottom end 204. The clamp 240 may form a base of the holder 208.

The clamp 240 receives and secures the ball joint stud 300 from moving in a plane normal to the primary axis 206. The clamp 240 in a closed configuration, secures an end of the ball joint stud 300 proximal to the bottom end 204. The clamp 240 may allow the ball joint stud 300 to grow along the primary axis 206 or restrain the bottom end of the ball joint stud 300.

The clamp secures the ball joint stud 300 such that on a longitudinal axis of the ball joint stud 300 is aligned in orientation and position with the primary axis 206. The clamp 240 further secures the ball joint stud 300 such that the neck 310, further described below, is in contact with the fixed die contact surface 214. The contact between the neck 310 and the fixed die contact surface 214 provided by the clamp 240 may initially be minimal. This minimal contact may not result in significant force being exerted by the fixed die contact surface 214 on the neck 310. The contact is sufficient, however, such that a force applied to the ball joint stud 300 opposite the contact, such as by an active die 220 will be resisted by the fixed die 210, both described below.

The clamp 240 further allows the ball joint stud 300 to rotate during compression.

The holder 208 further includes a holder slide rail 260. The holder slide rail 260 connects the holder 208 to the frame 230. The connection is translatable such that the holder 208 may translate about a plane normal to the primary axis 206. This translation beneficially allows the ball joint stud 300 to better align with the dies 210, 220. The holder slide rail 260 may be a linear guide rail. The holder slide rail 260 may restrict the translation of the holder to a linear direction. For example, the holder slide rail 260 may restrict the translation based on the translation 228 of the active die 220.

Figure 3B:
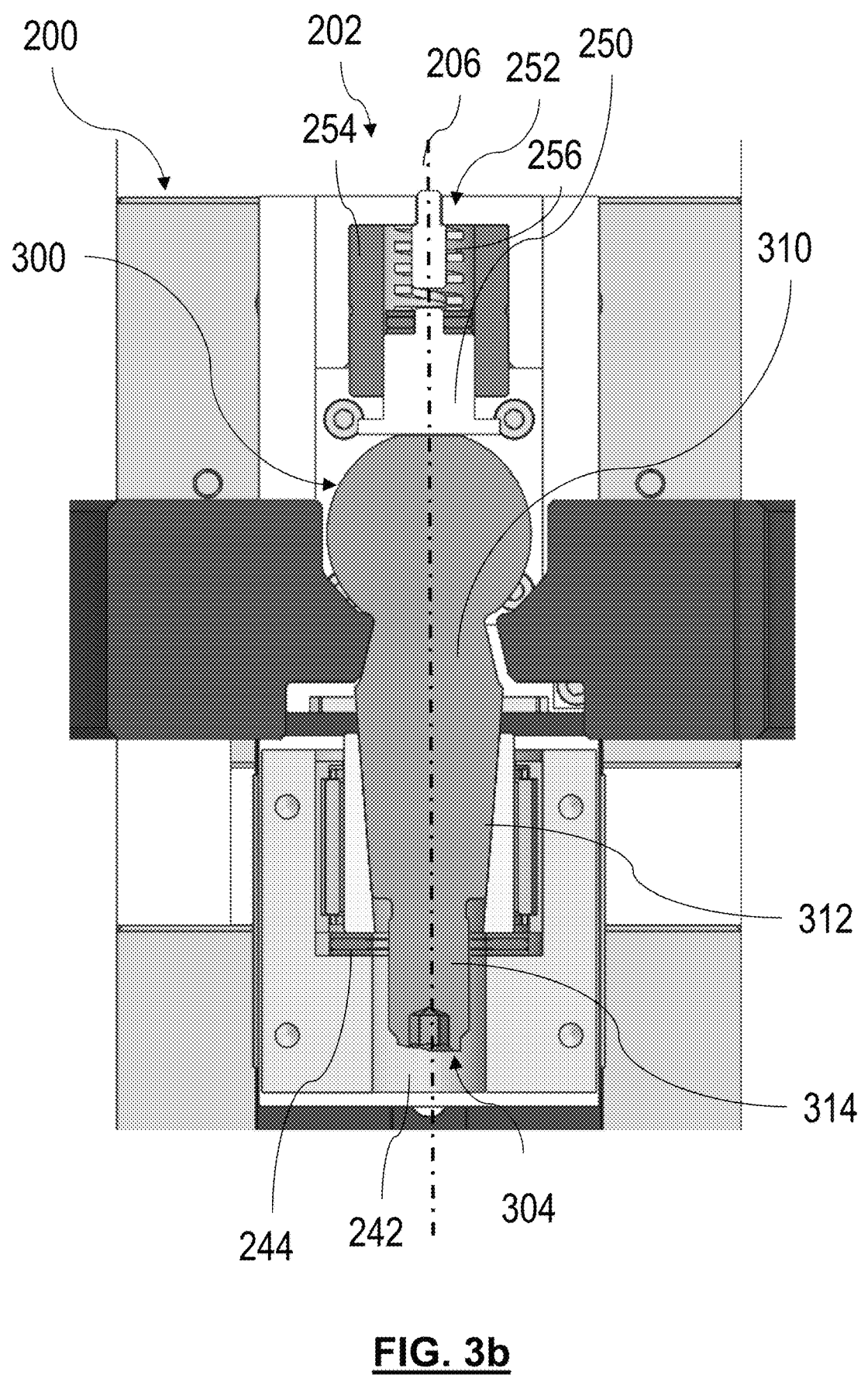

Referring to FIG. 3B shown therein is a side view cross-sectional schematic diagram of the work hardening apparatus 200 for work hardening the ball joint stud 300, according to an embodiment. The work hardening apparatus 200 and ball joint stud 300 may be the work hardening apparatus 200 and ball joint stud 300, respectively of FIGS. 2 and 3A.

The clamp 240 includes a shaft holder 242 that receives the taper shaft 312 further described below. The shaft holder 242 may particularly receive the cylindrical portion 314, further described below. The shaft holder 242 is disposed in a roller bearing 244 that enables rotation of the shaft holder 242 with the ball joint stud 300. The rotation is approximately about the primary axis 206. However, it is expressly contemplated that translation of the ball joint stud 300 and shaft holder 242 off the primary axis 206 may exist prior to or occur during the compression up to a runout threshold.

Figure 3C:
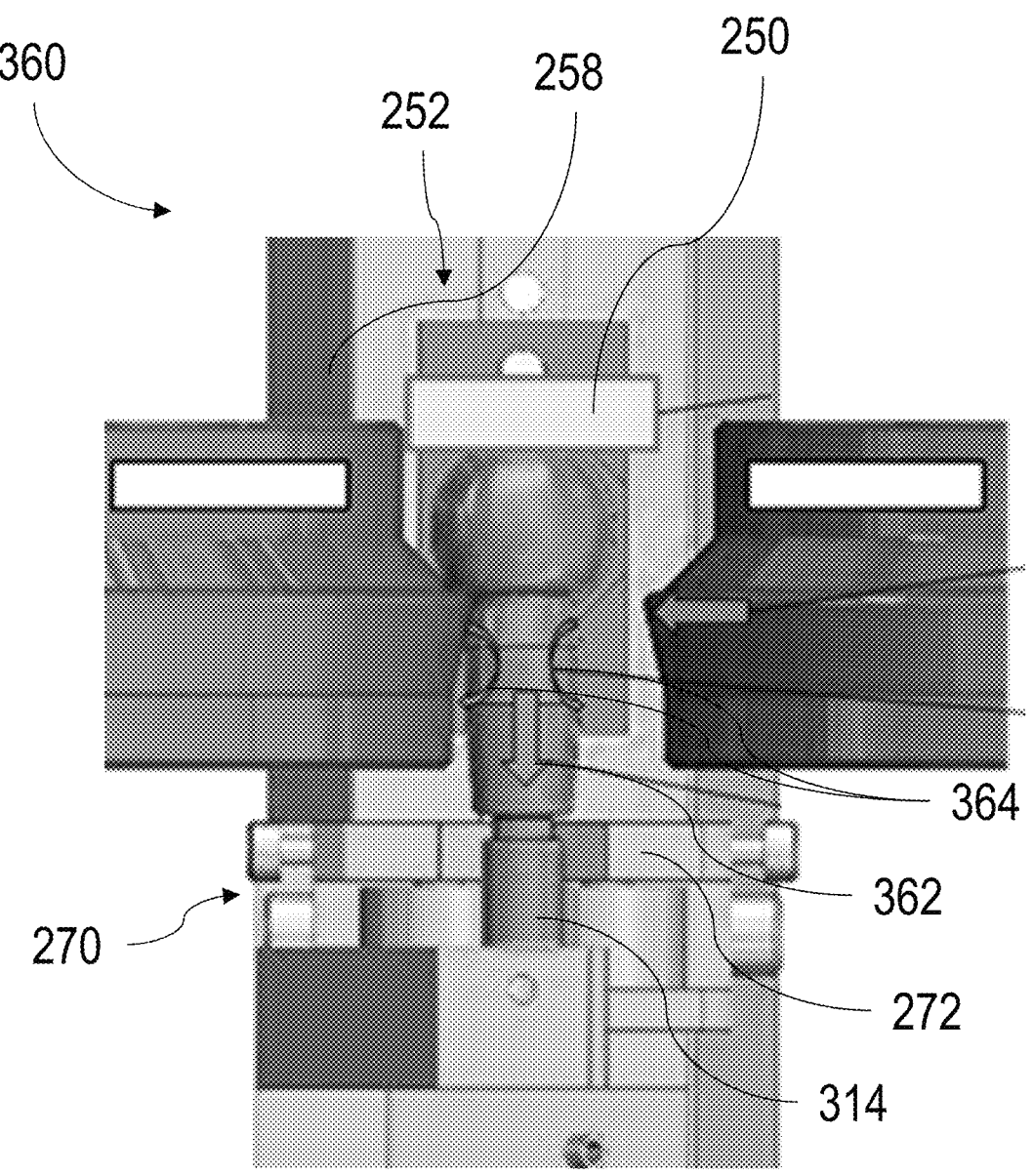
FIG. 3C is a further cut away schematic of the work hardening apparatus and ball joint stud of FIG. 2, according to an embodiment.

Referring to FIG. 3C, shown therein is a side view cut away schematic diagram of a work hardening apparatus 260 for work hardening a ball joint 360 according to an embodiment. The work hardening apparatus 260 and ball joint stud 360 are configured similarly to the work hardening apparatus 200 and ball joint stud 300, respectively of FIGS. 2 and 3A. The deformation may include radial growth 304 and axial growth 306.

The clamp 270 of the work hardening apparatus 260, may include an adjustable collar 272. The adjustable collar 272 may be configured (shown) in an open configuration to receive the ball joint stud 360. The open configuration may be the open configuration of the clamp 270. The adjustable collar 272 may be closed to a closed configuration to secure the ball joint stud 360. The closed configuration of the adjustable collar 272 may be the closed configuration of the clamp 270. It is expressly contemplated that the clamp 270 may include multiple adjustable collars 272 for accommodating various dimensions of the ball joint stud 360.

The clamp allows for axial growth 362 due to the radial compression 364 of the ball joint stud 360. The clamp 270 may secure the ball joint stud 360 at least in part by the cylindrical portion 314, further described below.

Referring again to FIGS. 2 and 3A, the holder 208 further includes a restraint 250. The restraint 250 receives and restrains an end of the ball joint stud 300 proximal to the top end 206. It is expressly contemplated that a magnitude restraint provided by the restraint 250 may range from minimal to full restraint. In embodiments where the restraint 250 provides minimal restraint, the restraint 250 may translate along the primary axis as a result of any force along the axis. For example, where the ball joint stud 300 expands axially, the expansion may force the restraint 250 vertically upward. In embodiments where the restraint 250 provides a full restraint, under reasonable forces, the restraint prevents the ball joint stud 300 from expanding towards the top end 202 unless released.

The restraint 250 is adjustably connected to the frame 210 by a restraint assembly 252. The restraint assembly 252 facilitates translation of the restraint 250 parallel to the primary axis 206.

In a first position, the restraint 250 is positioned to receive the ball joint stud 300. In a second position (shown), the restraint 250 is positioned to restrain the ball joint stud 300. In the second position the restraint is positioned closer to the bottom end 204 than in the first position. In the second position, the restraint 250 contacts a top surface 302 of the ball joint stud 300. The contact may not initially exert any significant force on the top surface 302. The contact is sufficient, however, such that any expansion of the ball joint stud 300 along the primary axis 206 toward the top end 202 is restrained by the restraint 250.

Referring again to FIG. 3B, in an embodiment, the restraint assembly includes a restraint guide 252. The restraint 250 is disposed in the restraint guide 254. The restraint guide confines the translation of the restraint along the primary axis 206.

In this embodiment, the restraint 250 further includes a coil spring 256. The coil spring 256 is disposed in the restraint guide 254 such that the restraint 250 is disposed between the ball joint stud 300 and the coil spring 256. The coil spring 256, when compressed by the translation of the restraint 250 towards the top end 202, provides an opposing force to maintain contact of the restraint 250 with the ball joint stud 300.

Referring again to FIG. 3C, the restraint assembly 252 includes a restraint slide rail 258. In this embodiment, the restraint slide rail 258 releasably secures the restraint 250 in any allowed position.

Ball Joint Stud:

Referring again to FIGS. 2 and 3A, the ball joint stud 300 may be used as an automobile ball joint stud in an automobile, such as a car or a truck. The ball joint stud 300 has been used to allow free rotation in two planes at the same time as a component of the front suspension system of a vehicle when the steering wheel is turned to move the vehicle's wheels. Some vehicles have four or more ball joints, at least two connecting each front wheel. Such two ball joint configurations, with control arms, enable motion in all three planes. Some vehicles, for example those with multi-link suspension configurations, utilize more than 2 ball joints per suspension assembly at each corner of the vehicle. In addition, the ball joints allow the front end of an automobile to be steered and a spring and shock (damper) suspension to make the ride comfortable and stable as it encounters road bumps.

The ball joint stud 300 is generally configured to allow free rotation in three planes (i.e. movement in all planes is possible). Two ball joints may be combined with control arms to enable motion in all three planes. This may allow a front end of an automobile to be steered and provide allow a spring and shock suspension for making rides more comfortable, such as when the automobile travels along an uneven surface. On modern automobiles, the ball joint stud 300 provides a pivot between the wheel and the suspension of the automobile.

In the automobile context, the ball joint stud 300 may act as a spherical bearing that connects a control arm to a steering knuckle. The ball joint stud 300 may provide a pivoting movement between the steering knuckles and control arms in an automobile's steering and/or suspension system. In the front suspension design in modern automobiles, the ball joint stud 300 may connect to an outer end of a lower control arm and a steering knuckle on each side of the automobile. The ball joint stud 300 may be attached to the control arm by rivets or nuts and bolts or may be pressed into the control arm and held in place with a retainer. The ball joint stud 300 may be attached to the steering knuckle by nuts and bolts or a cotter pin.

The ball joint stud 300 includes a generally spherical portion 308 (also referred to herein as "ball 308" or "spherical portion 308"). The ball 308 is disposed at a top end of the ball joint stud 300. The ball 308 is shaped to be received by the seat of a ball joint housing (not shown). The end of the ball 308 proximal to the top end may be truncated such that a top surface 302 of the ball joint stud 300 is flat. In an embodiment, the semidiameter of the ball 308 may be in the range of 20-40 mm.

The ball joint stud 300 further includes a neck 310. The neck 310 is positioned proximally and physically connected to the bottom end of the ball 308. In an embodiment, the neck 310 is frustoconical in shape. The neck may be oriented such that the portion of the neck with the smallest diameter is connected to the ball 308 and tapers outward away from the ball 308. The tapering of the neck 310 may prevent damage to the seat during the oscillation of the ball joint stud 300. The taper of the neck 310 may also reduce the stress on the seat, which may advantageously increase the durability toughness of the ball joint stud 300.

The form of the ball 308 and neck 310 allow the ball joint stud 300 to operate (rotate, oscillate, and/or translate) within the seat. The ball 308, neck 310, and seat may be formed such that the ball joint stud 300 operates within predetermined limitations. These limitations may be travel limitations. For example, the ball joint stud 300 may have an allowable oscillation angle of 28 degrees. These limitations may further be rate limitations. For example, the ball joint stud 300 may be constrained to rotate only up to a predetermined rotational velocity. These limitations may be within a predetermined tolerance. For example, an allowable oscillation angle may be 28+/−0.01 degrees. Wearing of the ball 308, neck 310, and/or seat may cause the ball joint to operate outside of these the predetermined limitations and/or tolerances. Operating outside of predetermined limitations or tolerances indicates that a failure of the ball joint stud 300 or the corresponding seat. Therefore, it is beneficial to work harden the neck against wear.

Referring again to FIG. 3B, the ball joint stud 300 further includes a tapered shaft 312. The tapered shaft 312 is positioned proximally and physically connected to the bottom end of the neck 310. The tapered shaft 312 is a truncated cone. In some embodiments, the second tapered shaft 312 may have a ⅙ taper or a ⅛ taper.

The ball joint stud 300 further includes a cylindrical portion 314. The cylindrical portion 314 is positioned proximally and physically connected to the bottom end of the tapered shaft 312. The cylindrical portion 314 is positioned at the bottom end 304 of the ball joint stud 300. The cylindrical portion 314 can be used to attach the ball joint stud 300 to other components. These components may be vehicle components such as a steering knuckle. The cylindrical portion 314 may be threaded to facilitate the attachment.

While different portions of the ball joint stud 300 are described, it is expressly contemplated that the ball joint stud 300 may be composed of a single piece or an assembly of multiple pieces.

Figure 4A:
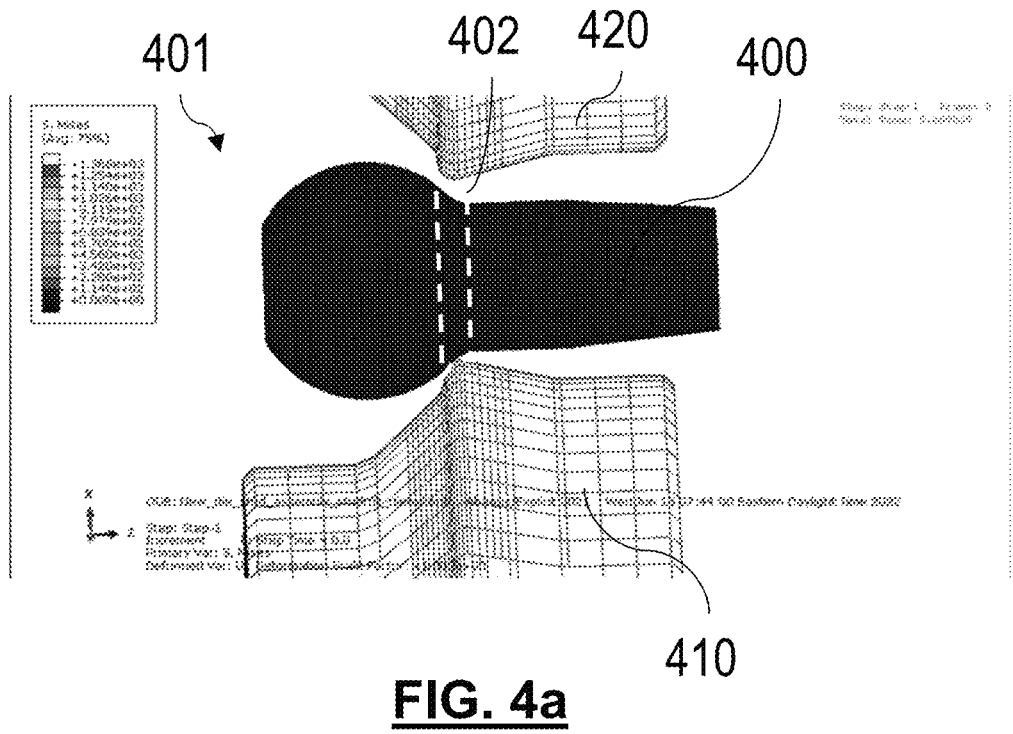
FIG. 4A is a finite element model schematic showing Von Mises stress in a ball joint stud disposed between a fixed die and an active die before application of the active die, according to an embodiment.
Figure 4B:
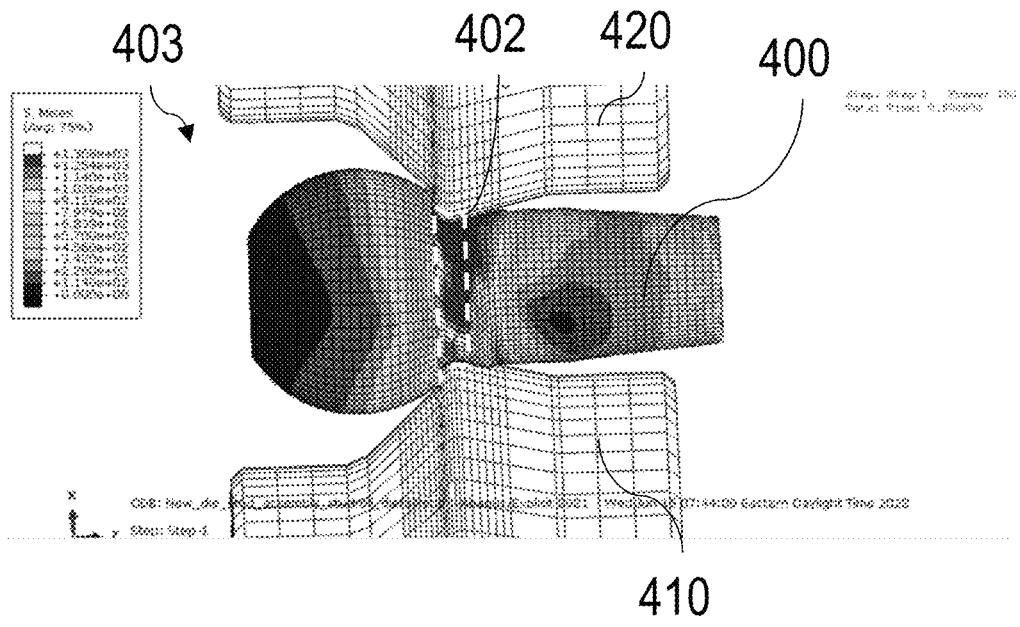
FIG. 4B is a finite element model schematic showing Von Mises stress in a ball joint stud disposed between a fixed die and an active die after application of the active die, according to an embodiment.

Referring to FIGS. 4A and 4B, shown therein are finite element models schematics showing Von Mises stress in a ball joint stud 400 disposed between a fixed die 410 and an active die 420 before 401 and during 403 application of the active die 420, respectively according to an embodiment. The ball joint stud 400 fixed die 410 and active died 420 may be the ball joint stud 300 fixed die 210 and active died 220, respectively, of FIG. 2.

FIG. 4A illustrates the active die 420 positioned away from the ball joint stud 400. In this position, the ball joint stud 400 is under negligible stress.

FIG. 4A illustrates the active die 420 positioned at a hard stop limit. In this position the ball joint stud 400 is engaged in the neck region 402 by both the fixed die 410 and the active die. As illustrated in FIG. 4A, the ball joint stud 400 experience stresses in the neck region. This stress may result outputs such as in plastic deformation, residual stress an increased surface hardness and as a further result improved fatigue life. The outputs are based at least in part by input parameters such as described above.

Figure 5A:
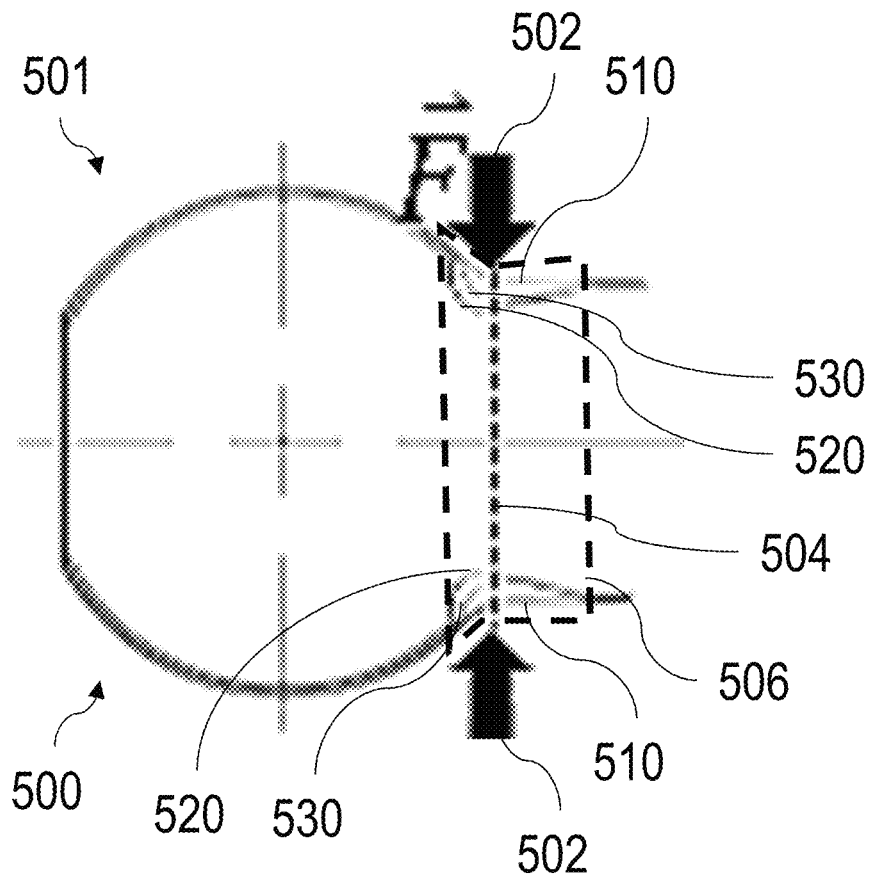
FIG. 5A is a cross sectional schematic diagram of a top portion of a ball joint stud illustrating deformation from work hardening, according to an embodiment.
Figure 5B:
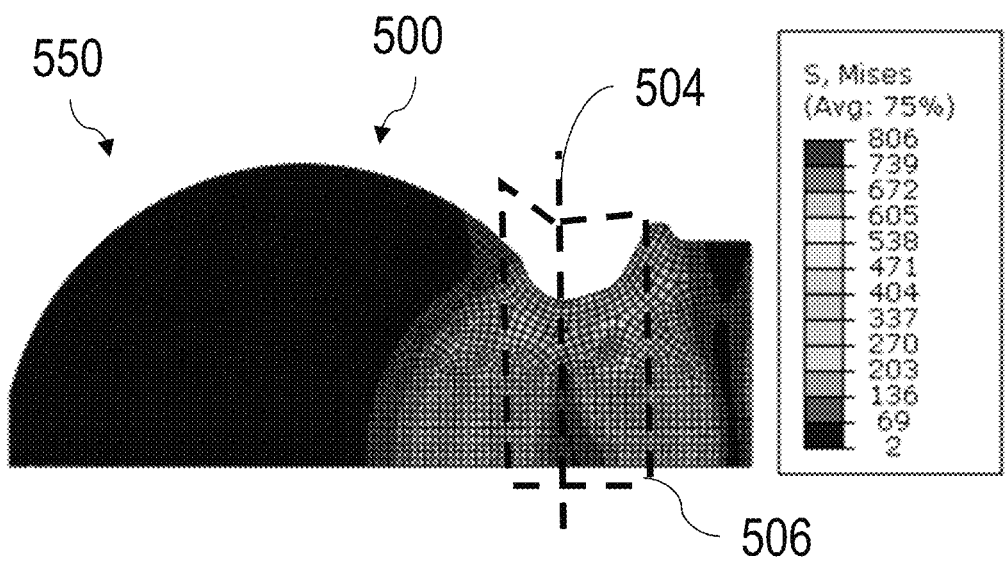
FIG. 5B is a cross sectional schematic diagram of a top portion of a ball joint stud illustrating compressive residual stresses from work hardening, according to an embodiment.

Referring to FIGS. 5A and 5B, shown therein is a cross sectional schematic diagram of a top portion of a ball joint stud 500 illustrating deformation 550 and compressive residual stresses from work hardening, according to an embodiment. The ball joint stud 500 may be the ball joint stud 300 of FIG. 2. A compressive force (F) 502 is applied to the ball joint stud 500. The compressive force may be the compressive force applied by the dies 210 of FIG. 2. The compressive force (F) 502 is applied about a line 504. The line 504 passes through a neck 506 region of the ball joint stud 500.

The diagram 501 illustrates an original profile 510 of the ball joint stud 500. The original profile 510 is the profile of the ball joint stud 500 prior to application of the compressive force (F) 502.

The diagram 501 further illustrates a compressed profile 520 of the ball joint stud 500. The compressed profile 520 is the profile of the ball joint stud 500 the compressive force (F) 502 is applied.

The diagram 501 further illustrates a residual profile 530 of the ball joint stud 500. The residual profile 530 is the profile of the ball joint stud 500 once the compressive force (F) 502 is removed. The residual profile 530 demonstrates the plastic deformation of the ball joint stud 500.

The diagram 550 illustrates the compressive residual stresses in the ball joint stud 500. The compressive residual stresses remain once the compressive force (F) 502 is removed. The compressive residual stresses beneficially decrease the intensity of applied stresses, such as during use of the ball joint stud 500. This intensity reduction beneficially increases the fatigue strength of the ball joint stud 500.

Figure 6:
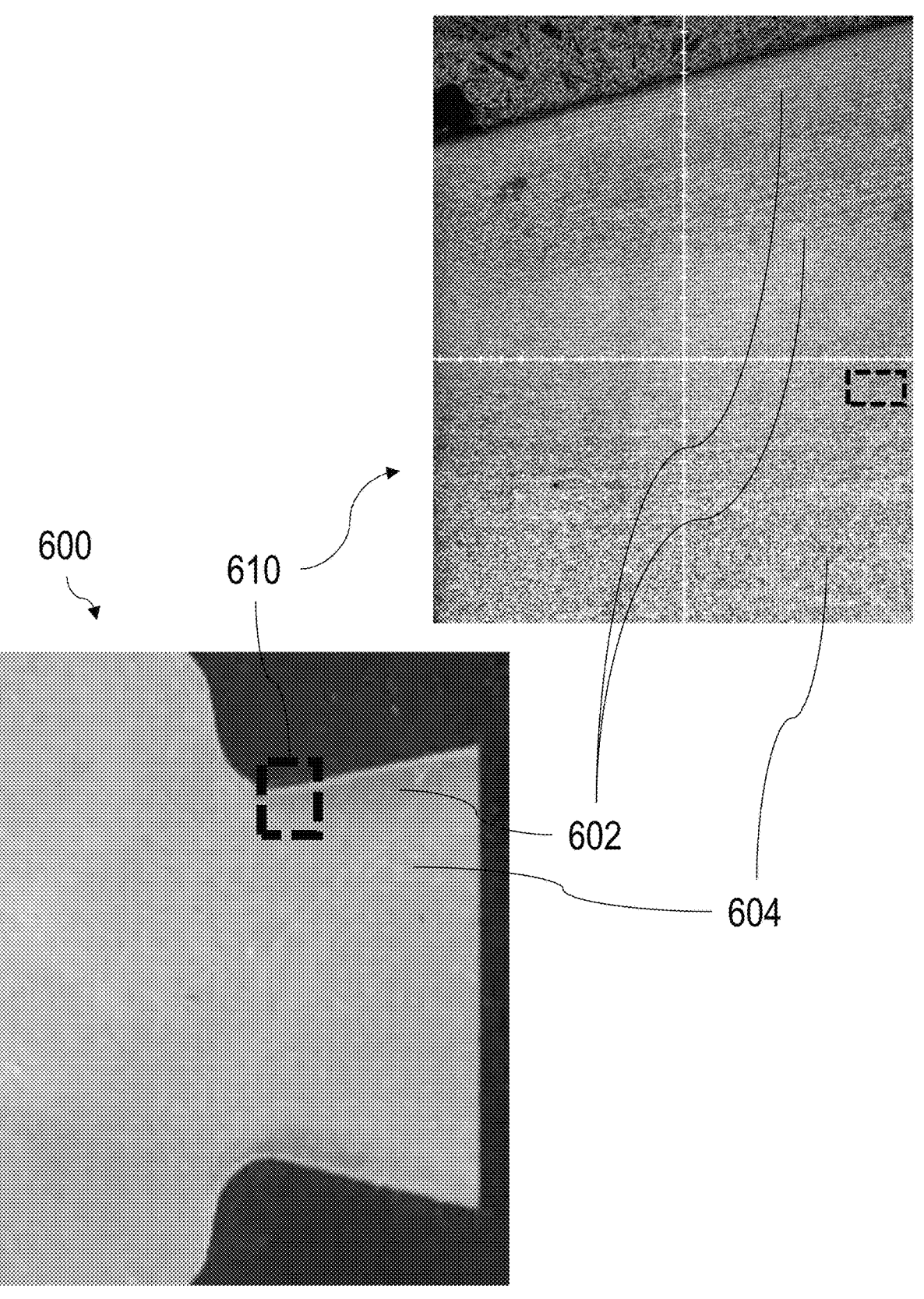
FIG. 6 is an optical microscope cross-sectional photograph of the neck section of the work hardened ball joint stud of FIG. 2, according to an embodiment.

Referring to FIG. 6, shown therein is an optical microscope cross-sectional photograph 600 of the neck section of a work hardened ball joint stud, according to an embodiment. The ball joint stud may be the ball joint stud 300 of FIG. 2 through FIG. 3B or 360 of FIG. 3C. Shown enlarged is a section 610 at the minimum diameter of the neck section of the ball joint stud. The section 610 represents a critical location for ball joint stud work hardening.

Dark areas 602 of the photograph 600, indicate regions where the material microstructure was compressed via work hardening, such as the work hardening 100 of FIG. 1. Particularly the dark areas 602 illustrate the depth of the affected material. The darker regions appear after etching with a (nital) solution, indicating that the material was rolled over. In the dark areas 602, the grains are generally directional. Light areas 604 of the photograph 600 indicate areas where the microstructure is as-heat-treated. In the light areas 604 the grains are generally of uniform size. As depicted, the grains and grain boundaries of the dark areas 601 and generally finer than those of the light areas 604.

Figure 7:
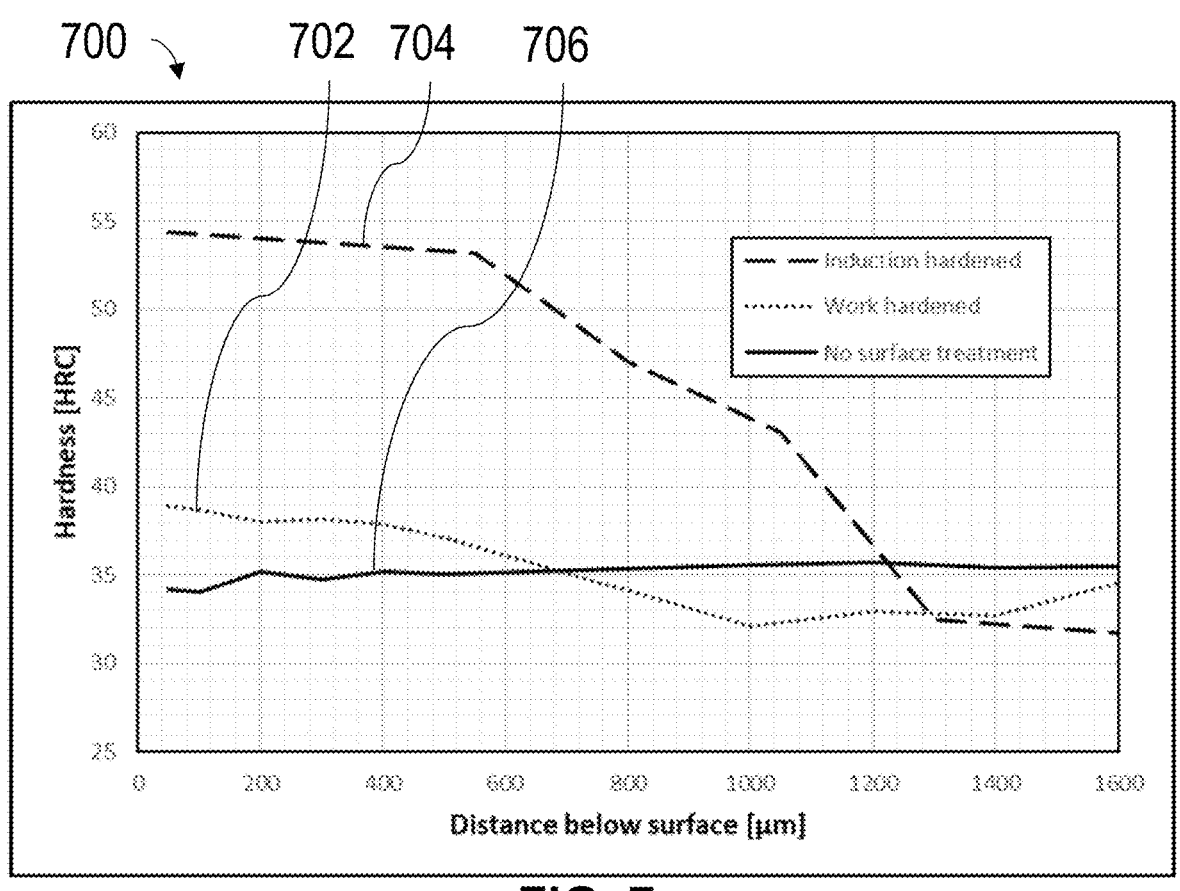
FIG. 7 is a chart illustrating a comparison of surface microhardness profiles of various ball joint studs.

Referring to FIG. 7, shown there is a chart 700 illustrating a comparison of surface microhardness profiles of various ball joint studs. The profiles include surface microhardness profiles of ball joint studs such as of the present disclosure (e.g. ball joint stud 300 of FIG. 2) 702 (estimated), an induction hardened ball joint stud 704, and a ball joint stud 706 that has not been surface treated. As illustrated, up to a certain distance below the surface, the ball joint stud of the present disclosure shows a marked improvement in surface hardness over untreated ball joint studs. This improvement is achieved without the costs and control concerns of induction hardening.

Figure 8:
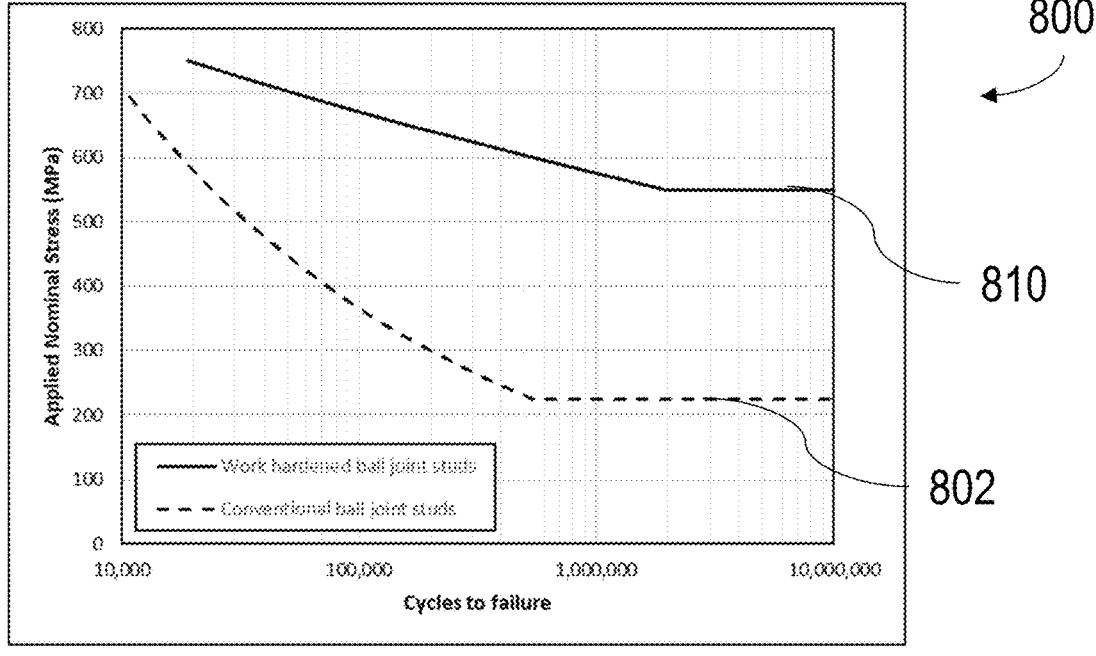
FIG. 8 is a chart illustrating results of fatigue life testing of various ball joint studs under various loads.

Referring to FIG. 8, shown therein is a chart 800 illustrating results of fatigue life testing of various ball joint studs under various loads. The loads are applied in fully reversed bending cycles up to separation. The fatigue life indicated is the number of cycles applied at separation. The no surface treatment trendline 802 illustrates the results of the testing on untreated ball joint studs. The work hardened trendline 810 illustrates the results of the testing on ball joint studs that, after machining, were work hardened via the process 100 of FIG. 1. It will be appreciated that testing was ceased prior to the failure of the ball joint studs in the tests producing the results beyond 10 million cycles.

Figures 9, 10:
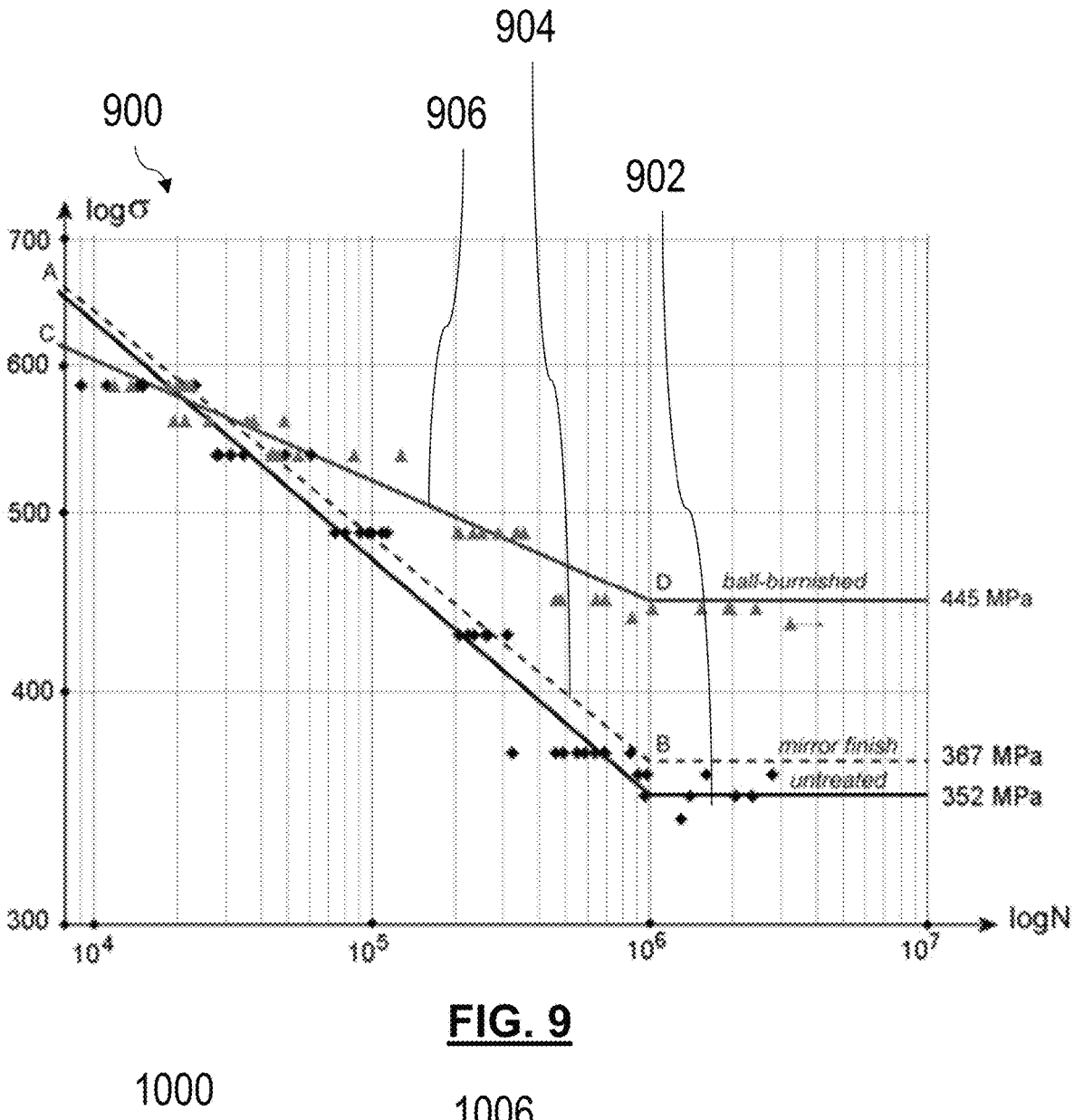
FIG. 9 is a chart illustrating results of rotating bending fatigue testing of specimens of a material treated under various processing conditions.
FIG. 10 is a chart illustrating peak/valley surface condition curves of a ball joint stud before and after roller burnishing.

Referring to FIG. 9, shown therein is a chart 900 illustrating results of rotating bending fatigue testing of specimens of a material treated under various processing conditions. The untreated trendline 902 illustrates the results of the testing on untreated specimens. The mirror finish trendline 904 illustrates the results of the testing on mirror finish specimens. The ball burnished trendline 906 illustrates the results of the testing on ball burnished specimens. As illustrated, the specimens treated by ball burnishing 906 show a marked improvement in rotating bending fatigue over untreated specimens. Similar results are expected when treating ball joint studs such as the ball joint stud 300 of FIG. 2 via the work hardening 100 of FIG. 1.

Referring to FIG. 10, shown therein is a chart 1000 illustrating peak/valley surface condition curves of a ball joint stud before 1002 and after 1004 roller burnishing. The ball joint stud may be the ball joint stud 300 of FIG. 2. The Ra and total height of the peak/valley surface condition curve 1004 shows a marked improvement in surface finish of the ball joint stud after roller burnishing.

While the above description provides examples of one or more apparatus, methods, or systems, it will be appreciated that other apparatus, methods, or systems may be within the scope of the claims as interpreted by one of skill in the art.

The invention claimed is:

1. A method for refining a ball joint stud comprising:
work hardening a neck of the ball joint stud, wherein the neck includes grains that are elongated in a direction of rolling, wherein a ball joint extends from the neck and is shaped to be received by a seat of a ball joint housing;
receiving and releasably securing the ball joint stud, in a holder, between a first die and a second die;
translating one or more of the first die and the second die towards the remaining die to apply a compression pressure to the neck of the ball joint stud; and
rolling the ball joint stud in the direction of rolling;
wherein the compression pressure causes a plastic radial compression of the ball joint stud to a stroke length.

2. The method of claim 1 wherein the stroke length is based on one or more of inducing a desired residual stress in the ball joint stud and increasing a surface hardness of the ball joint stud to a predetermined threshold.

3. The method of claim 1 further comprising rotating one or more of the first die and the second die are during the application of the compression pressure for improving the surface finish of the ball joint stud.

4. The method of claim 1 further comprising:
rotating the first die at a first die rotational velocity to induce the ball joint stud to rotate at a ball joint stud rotational velocity; and
rotating the second die at a second die rotational velocity based on the ball joint stud rotational velocity wherein ball joint stud and second die at an interface of the second die with the ball joint stud progresses at a similar tangential velocity.

5. The method of claim 1 further comprising holding the first die and second die in contact with the ball joint stud for a dwell time.

6. The method of claim 1 further comprising translating the second die away from the ball joint stud wherein translating the active die towards the ball joint stud and translating the second die away from the ball joint stud is repeated until at least one predetermined threshold result is achieved.

7. The method of claim 1 wherein the holder is configured to secure the ball joint stud in a manner that allows axial growth and radial deformation of the ball joint stud and wherein securing the ball joint stud in the holder comprises:
restraining movement in a plane normal to a primary axis of the holder; and
aligning a longitudinal axis of the ball joint stud in position and orientation with a primary axis of the holder.

8. The method of claim 7 wherein securing the ball joint stud in the holder further comprises restraining a top surface of the ball joint stud.

9. A work hardened ball joint stud comprising:
a neck that is work hardened, wherein the neck includes grains that are elongated in a direction of rolling;
a ball joint extending from the neck, shaped to be received by a seat of a ball joint housing; and
wherein the ball joint stud is refined by:
disposing and releasably securing the ball joint stud, in a holder, between a first die and a second die;
translating one or more of the first die and the second die towards the remaining die to apply a compression pressure to the neck of the ball joint stud; and rolling the ball joint stud in the direction of rolling;

wherein the compression pressure causes a plastic radial compression of the ball joint stud to a stroke length.

10. The work hardened ball joint stud of claim 9 wherein the stroke length is based on one or more of inducing a desired residual stress in the ball joint stud and increasing a surface hardness of the ball joint stud to a predetermined threshold.

11. The work hardened ball joint stud of claim 9 wherein the ball joint stud is further refined by rotating one or more of the first die and the second die are during the application of the compression pressure for improving the surface finish of the ball joint stud.

12. The work hardened ball joint stud of claim 9 wherein the ball joint stud is further refined by:

rotating the first die at a first die rotational velocity to induce the ball joint stud to rotate at a ball joint stud rotational velocity; and rotating the second die at a second die rotational velocity based on the ball joint stud rotational velocity wherein ball joint stud and second die at an interface of the second die with the ball joint stud progresses at a tangential velocity.

13. The work hardened ball joint stud of claim 9 wherein the ball joint stud is further refined by holding the first die and second die in contact with the neck of the ball joint stud for a dwell time.

14. The work hardened ball joint stud of claim 9 wherein the ball joint stud is refined by translating the second die away from the neck of the ball joint stud wherein translating the active die towards the ball joint stud and translating the second die away from the neck of the ball joint stud is repeated until at least one predetermined threshold result is achieved.

\* \* \* \* \*